United States Patent [19]

Zytkovicz et al.

[11] Patent Number: 5,479,967
[45] Date of Patent: Jan. 2, 1996

[54] METHOD OF FILLING A BOURDON TUBE WITH A GEL SUBSTANCE

[75] Inventors: Duane J. Zytkovicz, Onamia; Thomas J. McEvoy, Minnetonka, both of Minn.

[73] Assignee: B. Braun Medical, Inc., Plymouth, Minn.

[21] Appl. No.: 185,529

[22] Filed: Jan. 24, 1994

[51] Int. Cl.⁶ ........................................................ B65B 3/04
[52] U.S. Cl. .................... 141/7; 141/5; 141/8; 141/51; 141/65; 141/331; 29/527.1; 29/530
[58] Field of Search ........................ 141/5, 7, 8, 51, 141/65, 331, 364; 29/527.1, 530

[56] References Cited

U.S. PATENT DOCUMENTS

| | | | |
|---|---|---|---|
| 3,776,041 | 12/1973 | Wetterhorn | 73/738 |
| 4,061,163 | 12/1977 | Decker et al. | 141/7 |
| 4,099,550 | 7/1978 | Matsuzaki et al. | 141/51 |
| 4,567,921 | 2/1986 | King | 141/5 |
| 4,655,700 | 4/1987 | Ahmed | 141/5 X |
| 4,928,376 | 5/1990 | Poglitsch | 29/530 |
| 5,029,623 | 7/1991 | Brosig | 141/7 |
| 5,056,528 | 10/1991 | Zytkovicz et al. | 128/741 |
| 5,217,050 | 6/1993 | Varlet | 141/2 |

*Primary Examiner*—J. Casimer Jacyna
*Attorney, Agent, or Firm*—Joel D. Skinner, Jr.

[57] ABSTRACT

A method of completely filling an the interior cavity of a bourdon tube in a pressure gauge with a gelatinous substance, comprising the steps of:

a) evacuating the interior cavity of the bourdon tube to a vacuum level not greater than 50 millitorr;

b) depositing a predetermined amount of a gelatinous substance in the interior cavity; and c) venting the interior cavity to remove the vacuum level, whereby increasing air pressure forces the deposited gelatinous substance to completely fill the interior cavity.

10 Claims, 3 Drawing Sheets

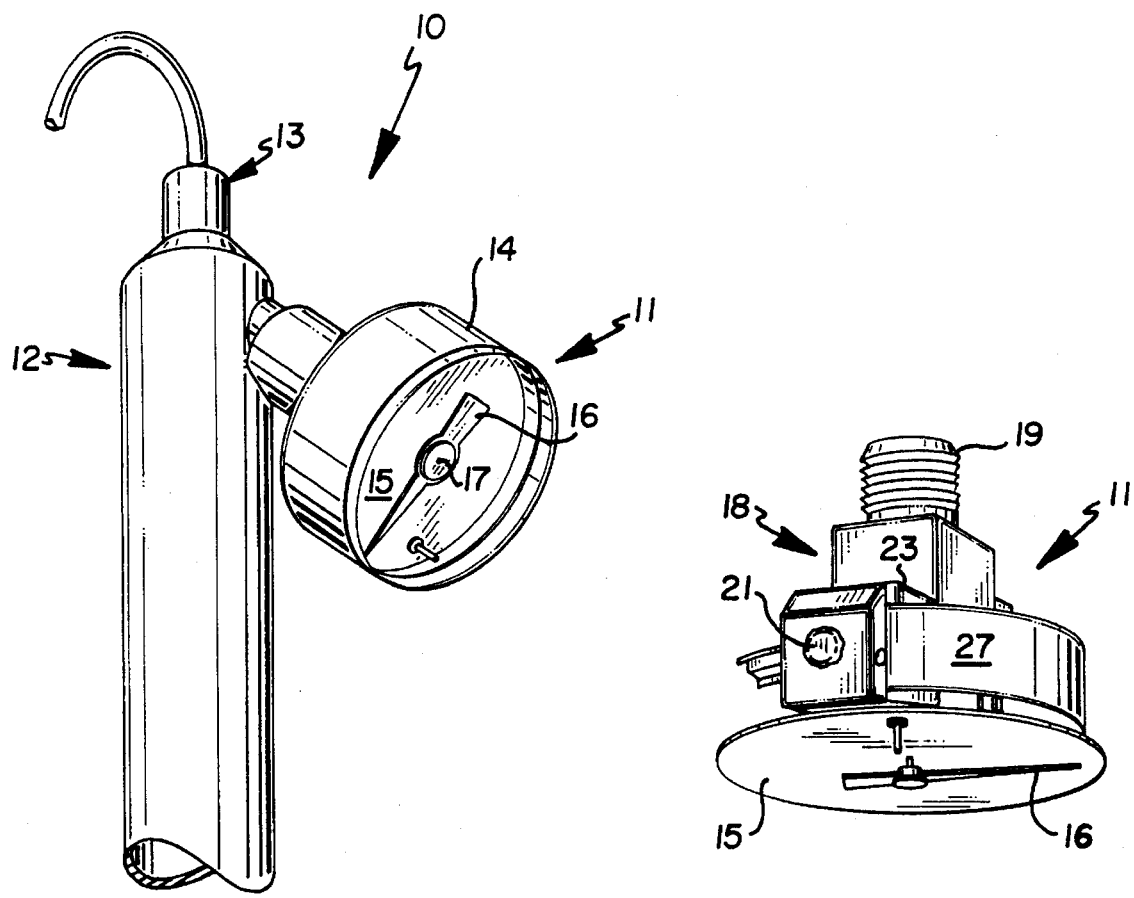
Fig. 1
Fig. 2
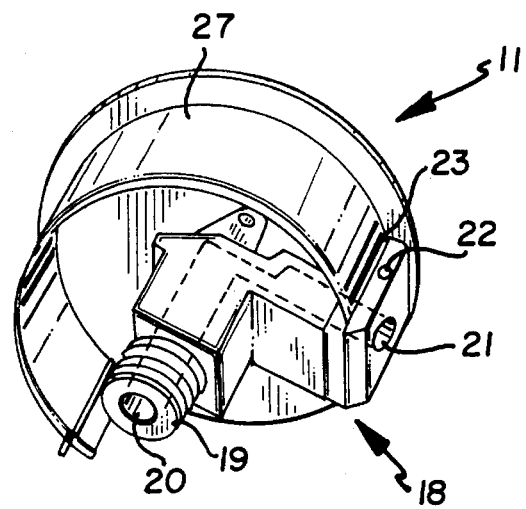
Fig. 3

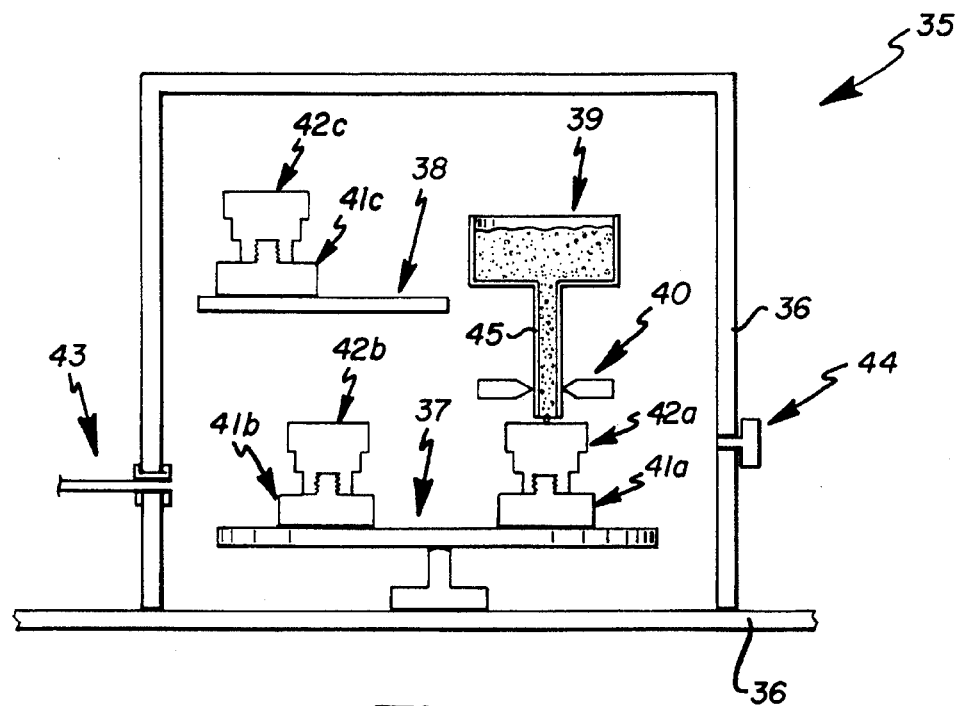
Fig. 5
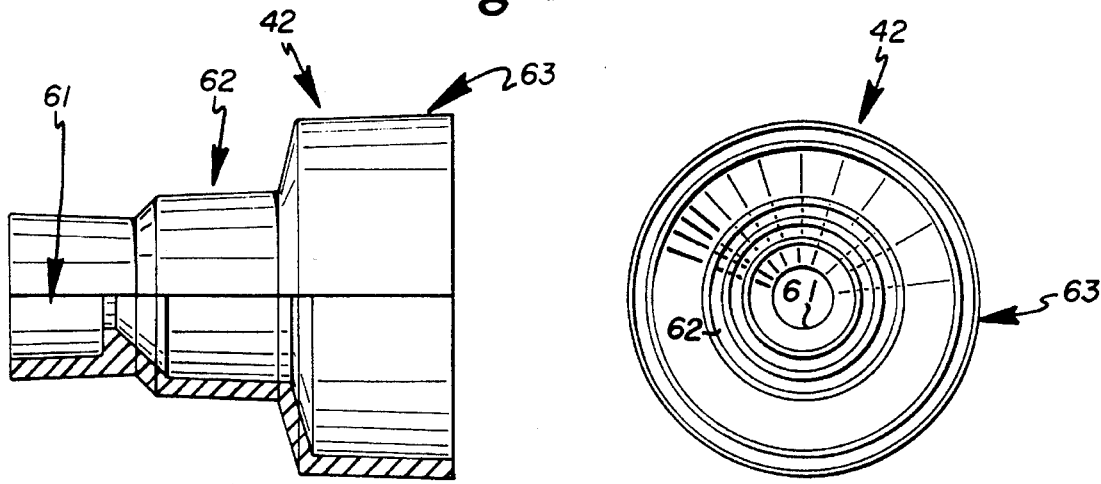
Fig. 7  Fig. 8

METHOD OF FILLING A BOURDON TUBE WITH A GEL SUBSTANCE

BACKGROUND OF THE INVENTION

1. Field of the Invention

The present invention relates to pressure gauges and filling methods, and more particularly, to a method of filling a bourdon tube pressure gauge with a gelatinous material for medical and other applications. The process allows standard off-the-shelf bourdon tube pressure gauges to be completely filled with a gelatinous substance.

2. Background Information

Bourdon tube pressure gauges are used in numerous medical applications, for example to monitor the internal pressures of balloons used to dilate blood vessels in an angioplasty procedures. Applicant's assignee has developed a gel filled bourdon tube pressure gauge which has several advantages over prior art gauges which are filled with oil, saline solution or other liquids, for example. Prior art hollow bourdon tube pressure gauges are known to have several problems in medical applications. Oil filled bourdon tube gauges require an isolating diaphragm. However, these isolating diaphragms require a large surface area to counteract the diaphragm's inherent stiffness, and the large size can compromise the sensitivity and accuracy of the gauge. Saline solution is highly corrosive to most metals typically used in apparatus construction. Also, the saline solution could induce electrolysis inside the bourdon tube due to the dissimilar metals used in its fabrication. And, electrolysis can put heavy metal ions into solution with the saline working fluid. Finally, the presence of air bubbles or voids in the prior art filled gauges causes an inherent safety problem in that if the balloon breaks, compressed gas may push fluid down the catheter shaft, through the ruptured balloon and into the patient's vascular system.

Significant advantages of the gel filled tube gauge, particularly the silicone gel filled gauge, include:

a. air need not be purged from the gauge or gauge tube:

b. the silicone gel in the gauge isolates and insulates contaminates from the working fluid;

c. the silicone gel does not compromise accuracy or functioning of the gauge;

d. the silicone gel is simple, compact, and does not increase the size of the gauge or the gauge system;

e. the silicone gel is cost effective;

f. the silicone gel is chemically inert and biocompatible; and g. the silicone gel reduces dynamic effects to the gauge and the gauge system due to sudden pressure changes. Nothwithstanding these advantages the process of filling the bourdon tube completely with a gelatinous material has proven to be a difficult task, particularly on a production volume basis. The bourdon tube must be completely filled with gel to avoid the formation of air bubbles or pockets which can detrimentally affect the performance and accuracy of the gauge. The filling process must also be accomplished without changing the calibration of the pressure gauge. Other factors that contribute to filling problems are that (1) there are a variety of designs of pressure gauges, including varying bourdon tube and fitting configurations, and (2) medical products manufacturers and OEM suppliers typically obtain bourdon tube pressure gauges from industrial suppliers and then modify the gauges to meet their particular requirements. These factors necessitate that gel filling process be able to be accomplished simply, reliably and economically by diverse users and on diverse product designs.

SUMMARY OF THE INVENTION

The present invention provides a method of completely filling the interior cavity of a bourdon tube with a gelatinous substance, comprising the steps of:

a) evacuating the interior cavity to a vacuum level not greater than 50 millitorr;

b) depositing a predetermined amount of a gelatinous substance in the interior cavity; and c) venting the interior cavity to remove the vacuum level, whereby increasing air pressure forces the deposited gelatinous substance to completely fill the enclosed space.

A preferred embodiment of the invention provides a method of filling a plurality of pressure gauges with a gelatinous substance, each pressure gauge having a hollow bourdon tube with an interior volume and an exterior orifice, comprising the steps of:

a) providing a vacuum chamber comprising a preconditioning shelf, a turntable, a stationary gel reservoir with a transfer conduit and valve disposed above the turntable, a vent valve, and a plurality of individual filling funnels;

b) placing a plurality of structures in the vacuum chamber on the turnable:

c) placing a plurality of structures on the preconditioning shelf;

d) connecting a filling runnel to each structure at its exterior orifice, the filling funnel being oriented vertically upright;

d) filling the gel reservoir with a predetermined amount of gelatinous substance;

f) evacuating the entire vacuum chamber to a vacuum level not greater than 50 millitorr;

g) sequentially filling each gauge by rotating the turntable so that the filling funnels attached to individual structures are aligned below the gel reservoir and actuating the valve to allow gel to flow from the reservoir through the conduit and into the filling funnel; and h) releasing the vacuum via the vent valve, whereby increasing air pressure forces the deposited gelatinous substance to completely fill the bourdon tube. The benefits of this invention will become clear from the following description by reference to the drawings.

BRIEF DESCRIPTION OF THE DRAWINGS

FIG. 1 is a perspective view of a medical balloon catheter inflator, including a pressure gauge.

FIG. 2 is a side view of the pressure gauge with its housing removed to show interior components.

FIG. 3 is a perspective view of the pressure gauge.

FIG. 5 is a plan view of an apparatus for practicing the preferred mode of the method of the present invention.

FIG. 7 is a side view of a gel filling funnel.

FIG. 8 is a top view of the gel filling funnel.

DESCRIPTION OF THE PREFERRED EMBODIMENT

FIG. 1 shows a medical balloon catheter inflator 10 of the type having a pressure gauge 11 to indicate the level of inflation of a catheter balloon. The pressure gauge 11 is connected to an inflator cylinder 12 via a threaded aperture 13. The pressure gauge 11, for example an Omega, Type T gauge, is capable of measuring pressures from approximately 0 to 300 psi or 0–20 atmospheres. The gauge 11 is of a type disclosed in U.S. Pat. No. 5,056,528 entitled Pressure Gauge: Gelatinous Filled Bourdon Tube, owned by Applicants' assignee.

Figure 4:
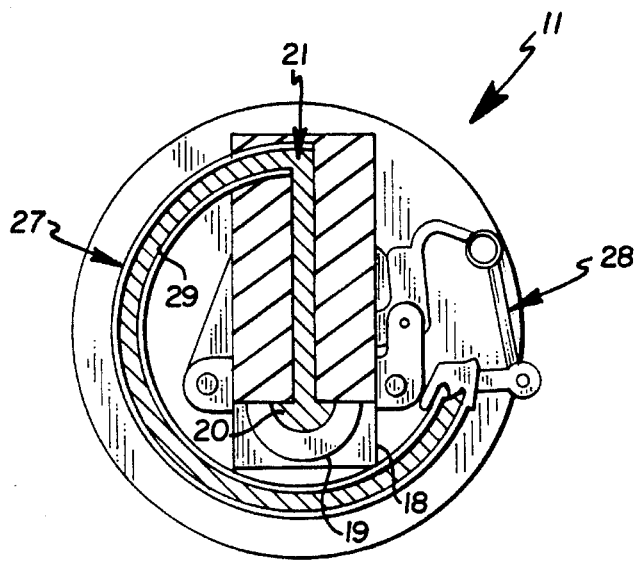
FIG. 4 is a crossectional view of a pressure gauge substantially filled with a gel substance.

Referring to FIGS. 2–4, the pressure gauge 11 basically comprises a housing 14, a face plate 15, an adapter block 18, a bourdon tube 27, and a linkage mechanism 28. An indicator 16 is movably disposed above the face plate 15 and is connected to the linkage mechanism 28 via a shaft 17. The block 18 is constructed of brass or a similar material and is shown to have a threaded nipple end 19, with an open end or external orifice leading to an interior channel 20, a second channel 21 connected to the channel 20 at a right angle, and a third channel 22 connected to the channel 21 at a right angle. The third channel 22 terminates at a connection slot 23 in the exterior of the block 18. The connection slot 23 is the point at which the bourdon tube 27 is connected to the block 18. The connections and seals made in the block are preferably made with a solder.

The bourdon tube 27 is a well known mechanism for detecting a pressure changes. The body of the hollow bourdon tube 27 deflects in response to changes in pressure. Deflection of the bourdon tube 27 may then be translated, by appropriate linkage or other means to an indicator, such as the pointer 16. In the gauge structure 11 shown, the tube 27 extends from its connection at the block 18 in a semicircular configuration to the linkage mechanism 28. The linkage mechanism 28 is comprised of several interconnected components which cooperate to convert deflection of the bourdon tube 27 to rotational movement of the pointer shaft 17. Although a particular gauge 11 structure is shown and described herein, the process of this invention is applicable to various alternative gauge structures.

A gelatinous material, preferably a silicone or polymeric substance, completely fills the channels 20–22 and the interior space of the bourdon tube 27. The gel substance is introduced into the bourdon tube 27 and connecting internal spaces of the pressure gauge 11 while in a liquid state. After curing, the silicone gel is formed. Since the gel does not flow, it remains in the tube 27 and connecting elements even when the gauge port 20 is inverted. The gel substance utilized must be very flexible so as not to affect the movement of the bourdon tube 27. An exemplary gel is a two part silicone system, such as that sold under the tradename Q7-2218 Silicone Gel System by Dow Corning of Midland, Mich.

In use, the gauge 11 is installed in a normal fashion to a balloon inflator 10, for example. System pressure acts on the face of the silicone gel in the port 20. Since the silicone gel is incompressible yet deformable, the pressure is transmitted by the silicone gel to the bourdon tube 27 which deflects in a normal manner in response to the application of pressure. The silicone gel is orders of magnitude more flexible than the bourdon tube 27 so the function and operation of the pressure gauge 11 is not changed. The linkage system 28 amplifies the movement of the bourdon tube 27 to move the pointer 16 which indicates the system pressure. Movement of the pointer 16 is a function of the actual pressure In its most basic form, the process of filling a bourdon tube gauge provided by this invention comprises the steps of:

1) orienting the gauge in a predetermined filling environment, such as a vacuum chamber, so that its terminal orifice or port 20 is disposed vertically upright;
2) applying a vacuum to the filling environment and evacuating it to a vacuum level of 50 millitorr (mtorr.) or less, preferably 40 mtorr.;
3) depositing a volume of gel (slug) into the bourdon tube 27 and the connecting internal spaces of the block sufficient to fill them; and finally
4) releasing air pressure into the filling environment by venting the vacuum chamber.

The venting allows incoming pressure to force the slug into the bourdon tube 27 and the connected interior cavities 20–22, substantially or completely filling them. This process can be practiced on a single gauge 11 or multiple gauges in a manufacturing process as described below.

Figure 6:
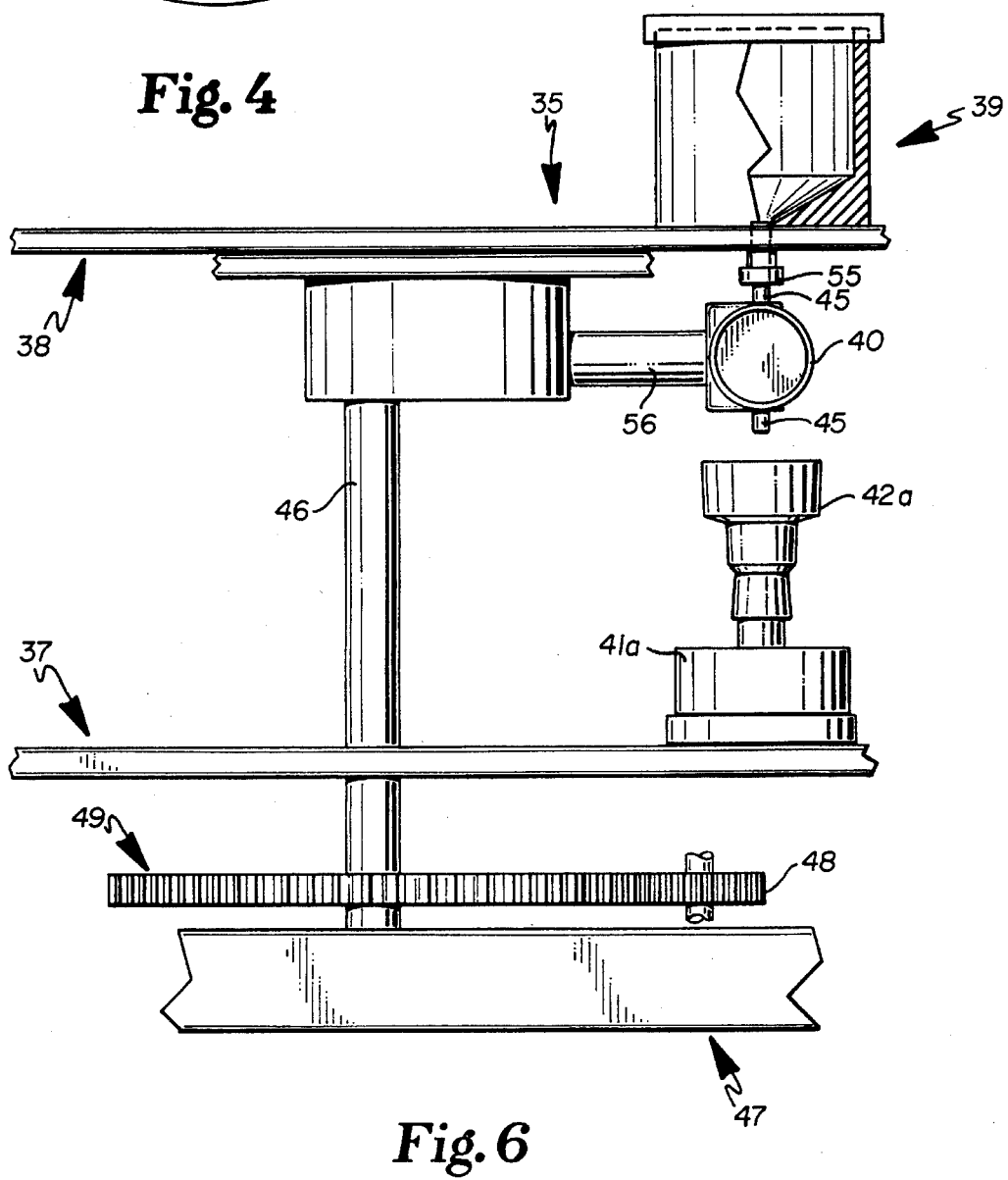
FIG. 6 is a side view of a preferred embodiment of the apparatus.

Referring to FIGS. 5 and 6, in a preferred embodiment of the process, multiple gauges 41a,b,c . . . n are filled at the same time in a batch process. The process is implemented via a vacuum apparatus 35 comprising a vacuum pump (not shown), a chamber 36 having a vacuum egress conduit 43 and enclosing a circular preconditioning shelf 38, a circular rotary base or turntable 37 driven by gears 48 and 49, a stationary gel reservoir 39 with a transfer conduit 45 and a flow control valve 40 disposed above the turntable 37 and held in place via a horizontal support 56 extending from a support beam 46, and a vent valve 44. The vacuum chamber 36 is disposed on a base 47. The preconditioning shelf 38 is preferably supported by the central support beam 46. The turntable 37 and support shelf 38 are preferably ring shaped and have an open central region through which the support beam 46 extends. Further, the turntable 37 and support shelf 38 preferably have predefined placement areas for orienting and stabilizing the gauges 11.

Individual molded filling funnels 42a,b,c . . . n of a number "n" equal to the number of gauges sought to be filled at one time are also provided for attachment to the external orifice 20 of each gauge 41. In this example, the chamber 35 and associated apparatus can hold a total of twenty gauges 41 and accommodate the filling often gauges 41 per batch. At a rate of three or four batches being filled in approximately eight hours, and ten additional gauges 41 being preconditioned with each batch filled, between 300 and 400 gauges may be completed per week using the process of this invention.

FIGS. 7 and 8 show a preferred embodiment of the filling funnel 42. The filling funnel 41 has an opened ended cylindrical structure with a proximal portion 61, a midsection 62 and a distal portion 63. The proximal portion 61 is for connection to the threaded nipple 19 of the gauges 11 and has an inside diameter which is equivalent to the outside diameter of the threaded nipple 19. The midsection portion 62 has an inside diameter which is greater than that of the proximal portion 61 and a predetermined height for holding a predetermined amount of liquid gel or slug. The distal portion 63 has an inside diameter which is greater than that of the midsection portion 61. It functions to receive liquid gel deposited from the reservoir tube 45 and funnel it to the midsection portion 62.

The most preferred embodiment of the batch process is as follows. First, approximately twenty gauges 41 are prepared for filling by attaching a filling Funnel 42 to each gauge at its external orifice 20. Ten gauges 41 are placed on the top preconditioning shelf 38 and ten gauges are placed on the turntable 37 with the filling funnels 42 being disposed vertically upright. Next, 20 ml. of gel is mixed at a ratio of 0.65 parts of Part B to 1.0 part of Part A of the two-part Q7-2218 gel system (for example). The resultant liquid mixture is placed in the gel reservoir 39. A piece of C-flex tubing 45, of a predetermined length, is connected to the bottom of the reservoir 39 via connector 55 and is clamped by a solenoid pinch valve 40. The chamber 36 is closed and evacuated for approximately 2.0 hours or to a vacuum level of preferably 40 millitorr. The process requires that a vacuum level of at least 50 mtorr. be achieved. One atmosphere of air pressure is equal to approximately 760 torr. The turntable 37 is rotated so that a gauge 41 is aligned directly below the reservoir tube 45 and the pinch valve 40 is opened, by remote control, to allow a predetermined amount of gel to run into the attached filling funnel 42. The small portion 62 of the funnel 42 is filled with gel, a slug, which then drains into the orifice 20, partially filling the bourdon tube 27 and the associated interior spaces of the gauge 11. The turntable 37 is rotated so the next gauge is in position and the slug loading process is repeated. When all ten gauges have been filled, the vacuum pump is isolated from the chamber 35 and the vent valve 44 is opened. The incoming pressure causes the gel slug to be pushed into the bourdon tube 27 of each gauge, completely filling its interior volume along with that of the connected interior spaces 20–22. Importantly, the filling process is accomplished without changing the calibration of the pressure gauge 11. The chamber 35 is then opened and the filled gauges are removed. The filling funnels 42 are removed from the gauges 41, and the gauges 41 are placed on a level surface for a predetermined time period to cure.

The second and any subsequent batches of gauges are prepared by moving the gauges which have been on the preconditioning shelf 38 during preparation of the previous batch to the rotary table 37. Ten new gauges with filling funnels attached are then placed on the preconditioning shelf 38. The gel reservoir 39 is cleaned with Freon and a new piece of tubing 45 is installed. A new batch of gel is mixed and placed into the reservoir 39. The vacuum chamber 35 is then closed and the filling process described above is repeated.

Although the preferred embodiment of the process of this invention is described for processing twenty gauges in one batch, ten being filled and ten being preconditioned, the apparatus and methods described may be modified to process fewer or more units consistent with the basic teachings of the invention.

As many changes are possible to the embodiments of this invention utilizing the teachings thereof, the descriptions above and the accompanying drawings should be interpreted in the illustrative and not the limited sense.

That which is claimed is:

1. A method of completely filling an enclosed space of a structure, of the type having an exterior orifice connected to the enclosed space, with a gelatinous substance, comprising the steps of: (a) preconditioning the structure by:
    (i) orienting the structure with its exterior orifice disposed vertically upright;
    (ii) attaching a funnel to the exterior orifice;
    (iii) evacuating for a first time the enclosed space to a predetermined vacuum level; and
    (iv) venting the enclosed space to remove the vacuum level; and
  (b) filling the structure by:
    (i) evacuating for a second time the enclosed space to a predetermined vacuum level:
    (ii) depositing a gelatinous substance in the enclosed space; and
    (iii) venting the enclosed space to remove the vacuum level.

2. The method of claim 1, wherein the structure is a pressure gauge, and wherein the enclosed space is predetermined interior cavity of a bourdon tube thereof.

3. The method of claim 1, wherein the gelatinous material is a silicone gel.

4. The method of claim 3, wherein the gelatinous material is a two part gel system.

5. The method of claim 3, wherein the gelatinous material is deposited into the enclosed space in a liquid state, and wherein the method comprises the additional step of curing the gelatinous material subsequent to said step of removing the vacuum.

6. The method of claim 1, wherein said predetermined vacuum level is not greater than 50 millitorr.

7. The method of claim 6, wherein said predetermined vacuum level is 40 millitorr.

8. A method of completely filling a plurality of pressure gauges with a gelatinous substance, each pressure gauge having a hollow bourdon tube with an interior volume and an exterior orifice, comprising the steps of:
  a) providing a vacuum chamber comprising a turntable, a stationary gel reservoir with a transfer conduit and valve disposed above the turntable, a plurality of individual filling funnels, and a vent valve;
  b) placing a plurality of bourdon tube pressure gauge structures in the vacuum chamber on the turntable;
  c) connecting a filling funnel to each structure at its exterior orifice, the filling funnel being oriented vertically upright;
  d) filling the gel reservoir with a predetermined amount of gelatinous substance;
  e) evacuating the entire vacuum chamber to a vacuum level not greater than 50 millitorr;
  f) sequentially depositing gelatinous substance in each gauge by rotating the turntable so that the filling funnels attached to individual structures are aligned below the gel reservoir and actuating the valve to allow gelatinous substance to flow from the reservoir through the conduit and into the filling funnel;
  g) and releasing the vacuum via the vent valve, whereby increasing air pressure forces the deposited gelatinous substance to completely fill the bourdon tube:
  h) removing the gauges from the vacuum chamber; and
  i) curing the gauges tier a predetermined period of time.

9. The method of claim 8, further comprising the step of placing a plurality of placing a plurality of structures on a preconditioning shelf disposed within the vacuum chamber prior to said evacuation step.

10. The method of claim 9, wherein the method is repeated in a cyclical manner with the preconditioned structures being moved to the turntable subsequent to removal of the filled structures therefrom, a new set of unfilled, unpreconditioned structures then being placed on the preconditioning shelf, the newly positioned preconditioned structures then being filled on the turntable.

* * * * *